United States Patent [19]

Sasaki et al.

[11] Patent Number: 4,632,270

[45] Date of Patent: Dec. 30, 1986

[54] FUEL SUPPLY PORT STRUCTURE OF FUEL TANK FOR VEHICLE

[75] Inventors: Michiaki Sasaki, Hadano; Norio Sasaki; Nariaki Nishida, both of Zama, all of Japan

[73] Assignee: Nissan Motor Co., Ltd., Yokohama, Japan

[21] Appl. No.: 657,899

[22] Filed: Oct. 5, 1984

[30] Foreign Application Priority Data

Oct. 12, 1983 [JP] Japan .................. 58-190200

[51] Int. Cl.⁴ .................................. B65B 1/04
[52] U.S. Cl. ....................... 220/86 R; 220/86 AT; 141/285
[58] Field of Search ........... 220/85 H, 85 VR, 85 VS, 220/86 R, 86 AT; 137/588, 592; 251/249.2; 138/37, 44; 141/285, 286, 291, 292

[56] References Cited

U.S. PATENT DOCUMENTS

| | | | |
|---|---|---|---|
| 2,414,909 | 1/1947 | Snyder | 220/86 R X |
| 4,327,783 | 5/1982 | Kanno et al. | 220/86 R X |
| 4,450,880 | 5/1984 | Scheurenbrand | 220/86 R X |

Primary Examiner—Steven M. Pollard
Attorney, Agent, or Firm—Schwartz, Jeffery, Schwaab, Mack, Blumenthal & Evans

[57] ABSTRACT

A fuel supply port structure of a fuel tank for use in vehicles comprises a filler tube with a neck portion and a fuel supply gun guide disposed within the filler tube. The fuel supply gun guide has an opening at the lower end thereof to receive a fuel gun inserted therethrough. The fuel supply gun guide also has a shutter plate pivotally connected so as to usually close the opening. The shutter plate pushed by the fuel gun inserted opens the opening, wherein the shutter plate has raised at the central portion thereof with which the fuel gun comes into contact, so that even if the fuel gun is insufficiently inserted, the free end portion of the shutter plate clears the flow of the fuel emanating from the fuel supply gun.

10 Claims, 4 Drawing Figures

FUEL SUPPLY PORT STRUCTURE OF FUEL TANK FOR VEHICLE

FIELD OF THE INVENTION

This invention relates to a fuel supply port structure of a fuel tank for use in vehicles such as automobiles and, more specifically, to a means for preventing the turbulence or disturbance of supplied fuel flowing through the fuel supply port for fuel tank.

DESCRIPTION OF THE PRIOR ART

A conventional fuel tank for vehicles of the type disclosed, for example, in Japanese Published Utility Model Application No. 53619/1980 has a fuel supply port structure which is adapted to prevent the supply of wrong fuel by means of a fuel supply gun guide having a shutter plate disposed in the neck protion of a filler tube in the fuel supply port structure.

Specifically, the fuel supply port structure of a fuel tank comprises a filler tube with a neck portion and a fuel supply gun guide disposed within the filler tube. The fuel supply gun guide has an opening at the lower end thereof sized so as to receive only a specific fuel supply gun therethrough. The opening is usually closed by a shutter plate rotatably mounted to the fuel supply gun guide at the lower end thereof and biased by a spring means to close the opening. The fuel supply gun, when inserted into the filler tube, pushes the shutter plate to open the opening, and then the fuel runs into the fuel tank through the filler tube from the fuel supply gun.

In the fuel supply port structure, however, there is a problem that the fuel flow emanating from the fuel supply gun is disturbed by the shutter plate which is in contact with the peripheral edge of the fuel supply gun, for part of the fuel emanating from the fuel supply gun runs against the free end of the shutter plate which is inclined to overlie the outlet port of the fuel supply gun. This is particularly true when the fuel supply gun is insufficiently inserted into the filler tube because the shutter plate tends to rotate toward the closed position, so that the less sufficiently the fuel gun is inserted, the more the shutter plate overlies the outlet port of the fuel gun.

The fuel running against the shutter plate splashes back onto the outer wall of the fuel supply gun which usually has a detection hole for automatic stopping of fuel supply, and consequently the fuel flows into the detection hole to stop the fuel supply in spite of the fact that the fuel tank is not filled with the fuel.

SUMMARY OF THE INVENTION

It is therefore a primary object of this invention to provide a fuel supply port structure of a fuel tank which prevents the turbulence or disturbance of supplied fuel flowing through the fuel supply port for the fuel tank.

It is another object of this invention to provide a fuel supply port structrue which is possible to prevent the malfunction of the automatic stopping mechanism for fuel supply.

It is another object of this invention to provide a fuel supply port structure having a shutter plate which is adapted, when opened, to readily clear the flow of the fuel emanating from a fuel gun into the fuel tank so as to prevent the fuel from running against the shutter plate.

In accordance with this invention, a fuel supply port structure comprises a filler tube and a fuel supply gun guide disposed within the filler tube and having a shutter plate pivotally connected to the fuel supply gun guide to usually close the opening of the fuel supply gun guide, the shutter plate having the central portion thereof raised toward the opening from the peripheral portion thereof, whereby when a fuel gun comes into contact with and pushes the central portion of the shutter plate, the free end of the shutter plate moves largely to clear the fuel flow.

These and other aspects and advantages of the invention will become apparently by reference to the following detailed description of a preferred embodiment when considered in conjunction with the accompanying drawing, wherein like numerals correspond to like elements throughout the drawing.

DETAILED DESCRIPTION OF THE PREFERRED EMBODIMENTS

Figure 1:
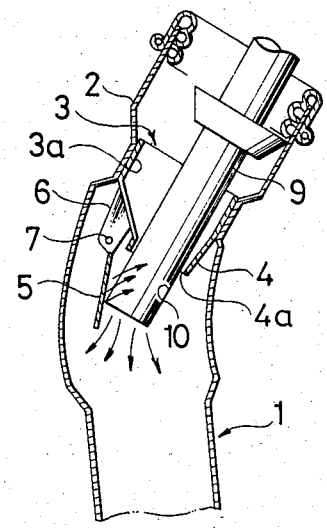
FIG. 1 is a cross sectional view of a conventional fuel supply port structure.
Figure 2:
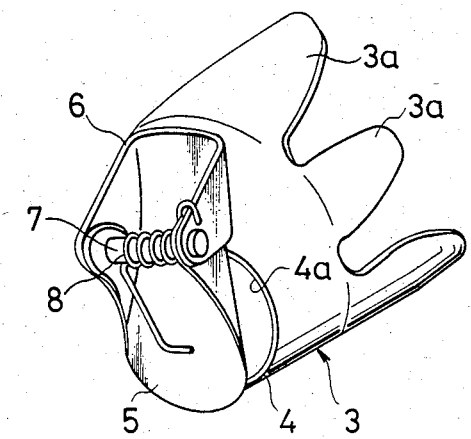
FIG. 2 is a perspective view of the fuel supply gun guide used in the fuel supply port structure of FIG. 1.

Referring to FIGS. 1 and 2, there is shown a fuel supply port structure for a fuel tank having a filler tube 1 with a neck portion 2 and a fuel supply gun guide 3 disposed within the neck portion 2. The fuel supply gun guide 3 is of a funnel-shape, that is, comprises an upper, enlarged peripheral flange portion 3a and a lower, reduced portion 4 and a upwardly flared portion therebetween. The peripheral flange portion 3a is secured by spot welding to the inner surface of the neck portion 2 of the filler tube 1. The reduced portion 4 of the fuel supply gun guide 3 is adapted to receive only a specific fuel supply gun 9 as detailed hereinafter. In addition, connected to the opening 4a at the tip portion of the reduced portion 4 is a shutter plate 5 which is adapted to open and close the opening 4a, in other words, rotatably journaled at a pin 7 by a bracket 6 extending from the gun guide 3. The shutter plate 5 is biased by a spring means 8 toward the opening 4a, so that the opening 4a is closed in a normal condition.

The outer diameter of the fuel supply gun 9 is varied depending on the fuel to be treated by the gun 9, and the inner diameter of the reduced portion 4 is determined such that the gun guide 3 in the neck portion 2 mates with the fuel supply gun 9 for a specified tank. In other words, the reduced portion 4 of the fuel supply gun guide 3 has an inner diameter slightly larger than the outer diameter of the fuel supply gun 9 so that only the specific fuel supply gun 9 can be inserted into the fuel supply gun guide 3. Accordingly, the fuel supply gun guide 3 is adapted to accommodate the fuel supply gun 9 only for a specified kind of fuel, and the fuel supply gun 9 thus accepted is adapted to push the shutter plate 5 against the force of the spring 8, thereby supplying the correct fuel into the fuel tank.

If a wrong fuel supply gun for a different type of fuel is inserted into the filler neck portion 2, the fuel supply gun 9 is abutted against the wall of the reduced portion 4 of the fuel supply gun guide 3 and prevented from further insertion, so that the shutter plate 5 is kept closed. Accordingly, the different kind of fuel supplied is retained in the fuel supply gun guide 3 to flow into a detection hole formed at the tip portion of the fuel supply gun 9 for automatic stopping of fuel supply, whereby fuel supply is automatically stopped to prevent the supply of any wrong fuel.

In such a conventional fuel supply port structure, since the shutter plate 5 must be pushed away for fuel supply by the tip portion of the fuel supply gun 9, if the fuel supply gun 9 is insufficiently inserted into the fuel supply gun guide 3, part of the free end portion of the shutter plate 5 remains just in front of the outlet port of the gun 9 as shown in FIG. 1. It will be noted that the shutter plate 5 is in a slidable engagement with the tip peripheral portion of the gun 9 and that the free end portion of the shutter plate 5 would not completely clear the flow of the fuel emanating from the outlet port of the fuel supply gun 9. Therefore, the fuel supplied through the gun 9 tends to run against the free end portion of the shutter plate 5, causing part of the fuel to upwardly splash back over the tip peripheral portion of the gun in the slidable engagement with the shutter plate 5. The part of the fuel will flow down along the outer wall of the fuel supply gun 9 into the filler tube 1 but sometimes may flow into the detection hole 10 for automatic stopping of fuel supply disposed on the outer wall of the fuel supply gun 9. Accordingly, the fuel supply is sometimes automatically stopped in spite of the fact that the fuel tank is not filled with fuel.

Figure 3:
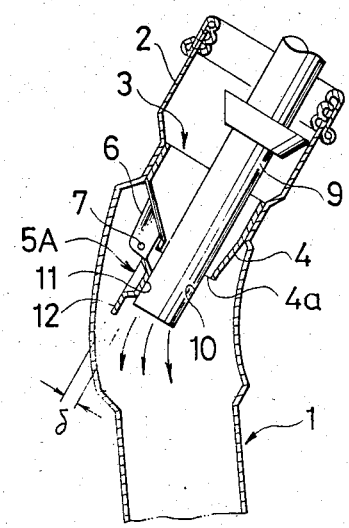
FIG. 3 is a cross sectional view of one embodiment of the fuel supply port structure incorporating the present invention.
Figure 4:
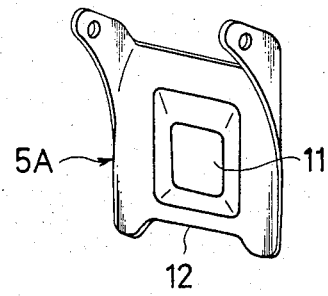
FIG. 4 is a perspective view of the shutter plate used in the embodiment of FIG. 3.

Now referring to FIGS. 3 and 4, one embodiment of the present invention has the same construction of the fuel supply port structure as illustrated in FIGS. 1 and 2 except for the shutter plate 5A. That is, the present fuel supply port structure comprises a filler tube 1 with a neck portion 2 and a fuel supply gun guide 9 of the funnel shape having a shutter plate 5A at the tip opening portion 4a thereof, the shutter plate 5A adapted to open and close the opening and being biased by a spring means 8 toward the opening 4a so that the shutter plate 5A is usually closed. In the embodiment of the present invention, there is provided a land 11 on the central portion of the shutter plate 5A raised from the peripheral portion thereof toward the opening 4a by embossing, such that the land 11 is adapted to come into contact with the peripheral edge or outer surface of the fuel supply gun 9 when the fuel supply gun is inserted into the filler tube 1.

In addition, the shutter plate 5A has a cutout 12 at the free end portion thereof, so that the flow of fuel supplied will not run against the portion of the shutter plate otherwise existing at the place of the cutout 12.

In the construction mentioned above, even if the fuel supply gun 9 is not fully inserted into the reduced portion 4 of the fuel supply gun guide 3, the land 11 of the shutter plate 5A will come into contact with the peripheral edge or outer surface of the fuel supply gun 9, so that the free end of the shutter plate 5A is pushed away from forward of the fuel supply gun 9. Consequently, a clearance δ corresponding to the height of the land 11 is formed between the tip peripheral edge or outer surface of the fuel supply gun 9 and the free end portion of the shutter plate 5A, whereby the shutter plate 5A will completely clear the flow of the fuel emanating from the outlet port of the fuel supply gun 9. It will be noted that the free end portion of the shutter plate 5A is directed almost parallel to the outer surface of the gun 9.

Accordingly, the fuel fed through the fuel supply gun 9 flows down through the filler tube 1 substantially without running against the free end of the shutter plate 5A. Even if part of the fuel runs against the free end portion of the shutter plate 5A, such fuel goes through the clearance δ provided between the tip peripheral portion of the fuel supply gun 9 and the free end portion of the shutter plate 5A which is now directed almost parallel to the outer surface of the tip peripheral portion of the fuel gun 9, and the fuel flows down through the filler tube 1, and therefore will never splash back over the outer surface of the fuel supply gun 9. Particularly, the cutout 12 formed at the free end portion of the shutter plate 5A is effective for preventing the fuel from running against the free end of the shutter plate 5A.

Accordingly, the fuel running into the filler tube 1 will never splash back onto the outer surface of the fuel supply gun 9 to flow into the detection hole for automatic stopping of fuel supply, so that the malfunction of automatic stopping during fuel supply is completely avoided.

While preferred embodiments of this invention have been shown and described, it will be appreciated that other embodiments will become apparent to those skilled in the art upon reading this disclosure, and, therefore, the invention is not to be limited by the disclosed embodiments.

What is claimed is:

1. A fuel supply port structure of a fuel tank for use in vehicles comprising a filler tube with a neck portion and a fuel supply gun guide disposed within said filler tube, said fuel supply gun guide having an opening at the lower end thereof and a shutter plate having a cutout portion at one end thereof and pivotally connected at the other end thereof close to said opening so as to open and close said opening, said opening adapted to receive a fuel gun inserted therethrough to abut onto a portion of said shutter plate, and said portion of said shutter plate being raised toward said opening from the peripheral portion thereof.

2. The fuel supply port structure of claim 1, wherein said portion of said shutter plate is raised enough for the free end portion of the shutter plate to clear the flow of fuel emanating from the fuel supply gun.

3. The fuel supply port structure of claim 1, wherein said portion of said shutter plate is raised such that the free end portion of said shutter plate is directed substantially parallel to the outer surface of the tip portion of said fuel supply gun.

4. The fuel supply port structure of claim 1, wherein said raised portion is formed by embossing.

5. The fuel supply port structure of claim 1, wherein said raised portion is formed by bonding a suitable piece of material onto the shutter plate.

6. The fuel supply port structure of claim 1, wherein said cutout prevents fuel from emanating from the fuel supply gun and running against the shutter plate.

7. A fuel supply port structure for a vehicle fuel tan, comprising:
a filler tube having a neck portion;
a fuel supply gun guide disposed within said filler tube and having an opening at the lower end thereof and a shutter plate pivotally connected at a first end close to said opening so as to open and close said opening, said fuel supply gun guide receiving a fuel supply gun;
means on said shutter plate for positioning said shutter plate out of the line of fuel flow from said fuel supply gun when said fuel supply gun is at least partially inserted into said filler tube, said positioning means including a land, said land contacting the outer surface of said fuel supply gun when said gun is inserted into said filler tube, and a cutout in said shutter plate at a second end opposite said first end.

8. A fuel supply port structure as claimed in claim 7, wherein said land is located on the central portion of said shutter plate and is raised from the peripheral portion of said shutter plate in a direction toward said opening.

9. A fuel supply port structure as claimed in claim 7, wherein said land is formed by embossing.

10. A fuel supply port structure as claimed in claim 7, wherein said land is parallel to said shutter plate.

* * * * *